United States Patent [19]

Lange et al.

[11] Patent Number: 4,713,881

[45] Date of Patent: Dec. 22, 1987

[54] TOOL FOR INSTALLING AN ECCENTRIC LOCKING COLLAR ON A BEARING

[75] Inventors: Ronald W. Lange, Bettendorf, Iowa; David F. Reynolds, Colona, Ill.; David R. Lolley, Bettendorf, Iowa; Gary L. Freeman, Hampton, Ill.

[73] Assignee: Deere & Company, Moline, Ill.

[21] Appl. No.: 838,652

[22] Filed: Mar. 11, 1986

[51] Int. Cl.⁴ .................. B21D 53/10; B23P 19/04; B25B 13/14
[52] U.S. Cl. .................................... 29/724; 81/129
[58] Field of Search ............. 29/279, 724, 270, 275; 81/129, 125, 121.1

[56] References Cited

U.S. PATENT DOCUMENTS

| | | | |
|---|---|---|---|
| 2,226,524 | 12/1940 | Runge et al. | 287/52.09 |
| 2,528,068 | 10/1950 | Marshall | 81/125 |
| 2,584,740 | 2/1952 | Reynolds | 287/52.09 |
| 2,701,494 | 2/1955 | Johnson | 81/125 |
| 2,728,616 | 12/1955 | Potter | 308/187.2 |
| 3,083,449 | 4/1963 | Simmons | 29/275 |
| 3,178,971 | 4/1965 | Bachli | 81/125 |
| 3,379,231 | 4/1968 | Gallo, Sr. | 81/125 |

OTHER PUBLICATIONS

Fafnir Bearing Division of Textron Inc., "How to Install the Fafnir Self-Locking Collar" (Form 512).

Primary Examiner—Mark Rosenbaum
Assistant Examiner—Irene Graves Golabi

[57] ABSTRACT

For assembling the locking collar of a conventional eccentric locking collar bearing assembly, an elongated driver tool holds the locking collar for threading over a shaft and into engagement with the bearing inner race and initial hand-tightening. Final tightening is by an impact wrench engaging a drive socket in the free end of the tool.

11 Claims, 7 Drawing Figures

TOOL FOR INSTALLING AN ECCENTRIC LOCKING COLLAR ON A BEARING

BACKGROUND OF THE INVENTION

The invention concerns a tool for completing the installation of a shaft-journalling bearing of the type in which an extended inner race is engaged by an eccentric locking collar for locking the bearing in position on the shaft and, more particularly, a tool for assembling the locking collar to such a bearing and applying a selected locking torque.

Mating an eccentrically cammed locking collar with a similarly cammed inner race of a bearing is a well known means for locking a bearing inner race to a shaft. Rotation of the locking collar relative to the inner race provides an initial clamping or locking action and further tightening occurs during operation due to the well known mechanical phenomenon of "rolling" or "creep", whereby a bearing inner race having a bore somewhat larger than the shaft and subjected to a one-directional load would rotate slower than the shaft if left free to do so. The sustained effort of the inner race to creep around the shaft while it is restrained by the locking collar tends to increase the clamping or locking force. (See, for example, U.S. Pat. No. 2,226,524 Runge, U.S. Pat. No. 2,584,740 Reynolds and U.S. Pat. No. 2,728,616 Potter).

In the conventional installation method, a preliminary manual assembly and hand-tightening of the locking collar onto the bearing is followed by a final tightening using a hammer and drift or a C-spanner. (The hammer and drift method is described in an instruction sheet, Form No. 512, of the Fafnir Bearing Division of Textron, Inc.) In either case, the tool engages a drive hole in the locking collar and "impacts" the collar so as to drive it more tightly onto the inner race. Disadvantages of these manual methods are the inevitable variations in the final torque applied and also the need to have sufficient space around the bearing installation to permit manipulation of the tools.

Bearings with self-locking collars are widely used on agricultural machines. A typical combine harvester, for example, may have more than fifty such bearings. When properly installed, they provide an efficient and cost-effective method of securing a bearing to a shaft.

SUMMARY OF THE INVENTION

Accordingly, it is an object of the invention to provide an improved means of installing the locking collar of an eccentric locking collar type bearing and in particular, one which facilitates the application of higher and more consistent instantaneous torques than conventional methods and one which is usable where limited access makes the use of conventional tools difficult or impossible.

According to one aspect of the invention, a sleeve-like tool has a holder end for receiving and drivably supporting the locking collar and is used to thread it over and along a shaft end, to be received by the extended inner race of a bearing already in place on the shaft. After the cam surfaces of the collar have been engaged by the cam surfaces of the bearing inner race, it is preferable to hand turn the locking collar, still held by the tool, to initially tighten or "snug" the collar on the bearing and shaft. In a preferred embodiment, with the locking collar engaged, the tool outer or drive end is accessible for receiving a powered driving means, such as an impact wrench, for final tightening of the locking collar.

Preferably, the locking collar holder end of the tool includes a retractable drive element for engaging a driving hole in the locking collar so that, after tightening the locking collar, the tool may be released by retracting the drive element and removing the tool by withdrawing it axially from the shaft end.

An advantage of a locking collar installation tool according to the invention is that the outside dimensions of the collar holder end need not be much greater than that of the locking collar itself so that the tool, with its hollow sleeve or shank, may reach deep into restricted space to install a locking collar. The nature of the tool provides virtually unlimited axial reach.

DESCRIPTION OF THE PREFERRED EMBODIMENT

Figure 3:
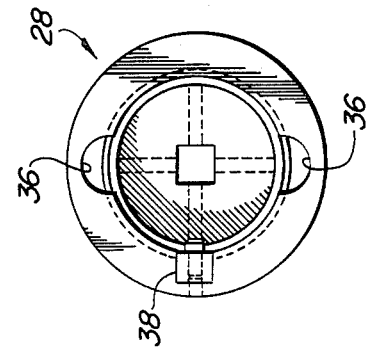
FIG. 3 is an end view of the locking collar holder end of the tool.
Figure 1:
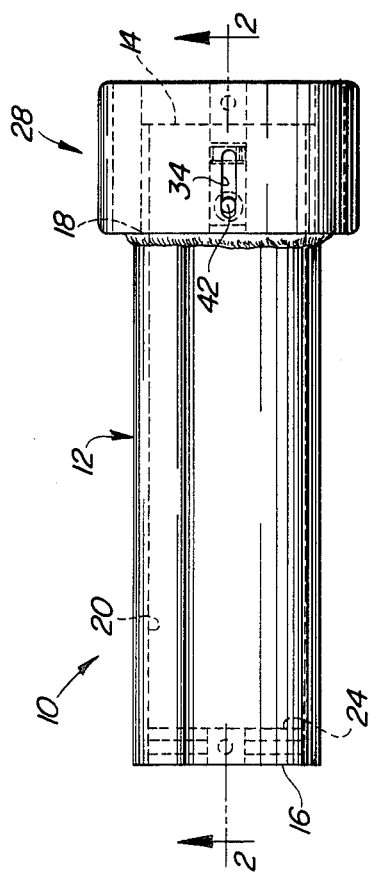
FIG. 1 is a side elevation of a locking collar tool according to the invention.
Figure 2:
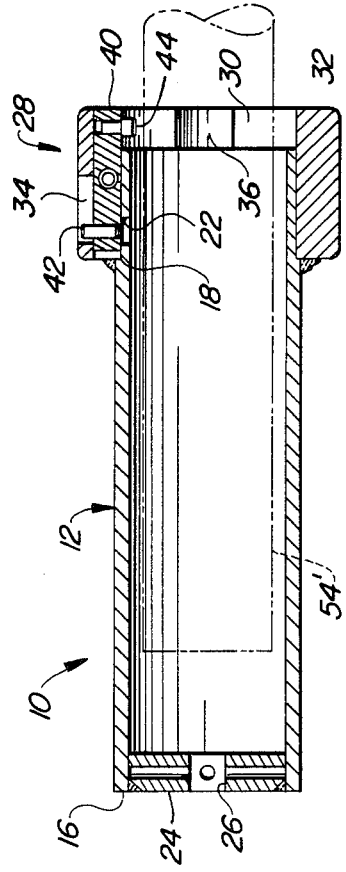
FIG. 2 is a longitudinal cross-section of the tool taken approximately on line 2—2 of FIG 1.

The invention is embodied in the locking collar installation tool 10 shown in general arrangement in FIGS. 1, 2 and 3.

The tool 10 is made up of three main components, rigidly connected to each other as, for example, by arc welding. They include a sleeve or body 12 having a collar end 14, a drive end 16, and a reduced diameter shoulder 18 at the collar end. A stop pin access hole 22 is adjacent the collar end 14. The axial bore 20 of the sleeve 12 is unobstructed except for a drive plate 24, carried at its drive end 16. A central square bore 26 of the drive plate 24 is shaped to receive a driving member, such as the bit of a conventional impact wrench.

The third main element of the tool is the locking collar holder or carrier portion 28 mounted concentrically on the sleeve 12. It is axially positioned by the shoulder 18 so that it extends beyond the collar end 14 of the sleeve and defines, with the end 14, a locking collar socket or recess 30 having an internal wall 32. Features of the collar holder 28 include a longitudinally extending slot 34, registering at one end with the drive pin access hole 22 of the sleeve 12, and opposite set screw clearance grooves 36, and also a longitudinally extending guideway 38 centered on the slot 34. Although welded assembly is used in the present embodiment, sleeve 12 and collar holder 28 could, of course, be detachable for convenient combination, for example, of sleeves of different lengths and collar holders of different sizes.

Figure 4:
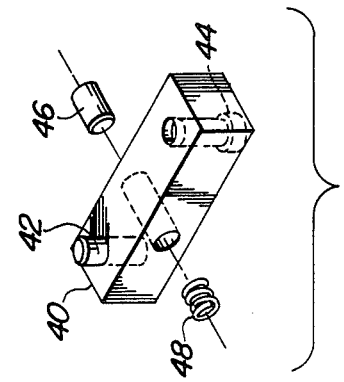
FIG. 4 is an enlarged perspective exploded view of the retractable tongue of the tool.

Free to slide axially in the guideway 38 is a tongue assembly 40. Stop pin 42 extends out into the slot 34 and thus limits axial movement of the tongue 40. At the opposite end of the tongue, a drive pin 44 extends radially, when the tongue is retracted, into the collar socket 30. The tongue 40 is retained in retracted or extended positions by the braking action of a spring-loaded pin 46 bearing on the side of the guideway 38 under the action of spring 48. (FIG. 4)

Figure 5:
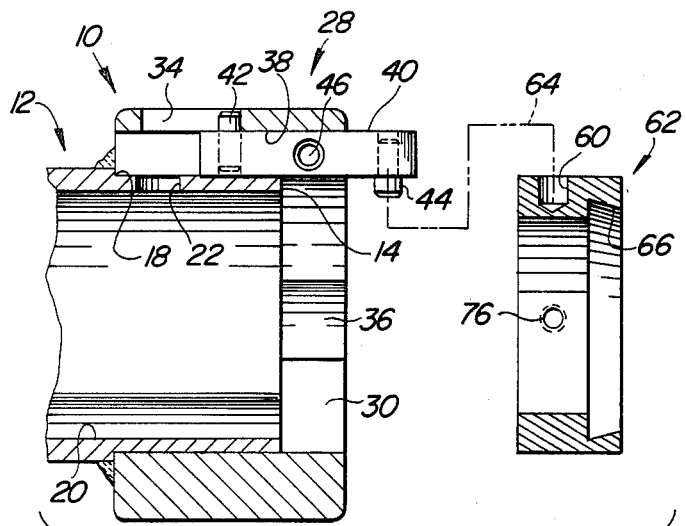
FIG. 5 includes an enlarged partial view of the tool similar to FIG. 2 with the tongue extended and the tool prepared to receive the locking collar.
Figure 6:
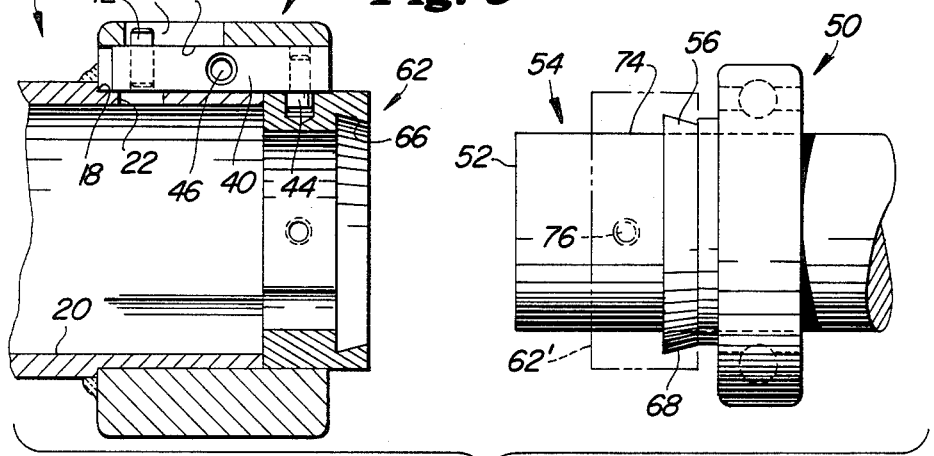
FIG. 6 includes a view similar to FIG. 5 with the tongue retracted and the locking collar held in the tool ready for installation on the bearing inner race.

In a typical assembly operation, an extended inner race bearing assembly 50 is already in place, inset from the free end 52 of a shaft 54. The bearing assembly 50 has been assembled with its cammed extended inner race 56 towards the shaft end 52, as shown in FIG. 6. (Additional details of the structure of a typical eccentric locking collar bearing assembly, such as the assembly 50, are given in U.S. Pat. No. 2,728,616 Potter.) The tongue 40 is extended into the position shown in FIG. 5 so that the drive hole 60 of locking collar 62 may be engaged by the drive pin 44 (as indicated by the line 64 in FIG. 5) and the collar slid inwards to be supported by the collar socket 30, as indicated in FIG. 6. (Note that the outward extension of the tongue 40 is suitably limited by the stop pin 42 engaging the outer end of the slot 34.) The tongue 40, and hence the locking collar 62, are retained in the retracted position by the friction of the detent pin 46 in the guideway 38 so that the locking collar, carried by the tool, can be conveniently brought to and threaded onto the end of the shaft, to bring the cam portion 66 of the locking collar 62 into mating engagement with the cam portion 68 of the inner race 56, as indicated in phantom outline in FIG. 6.

Figure 7:
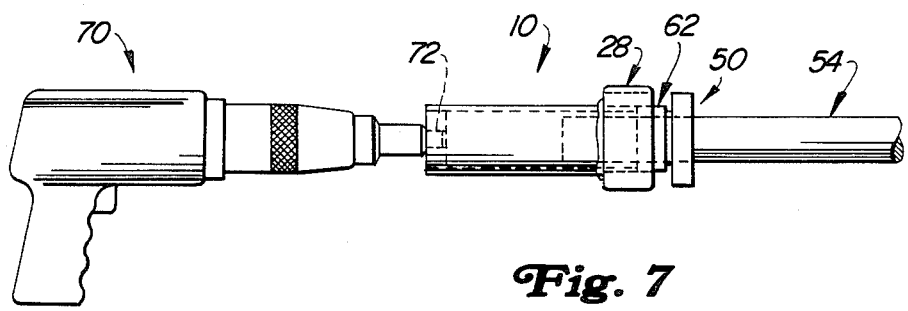
FIG. 7 is a side elevation to a smaller scale showing an impact wrench driving the tool to tighten a locking collar on a bearing inset from the end of a shaft.

Next, the locking collar 62 is manually "snug tightened" on the bearing by rotating the tool 10 in the normal direction of rotation of the shaft 54. Final tightening of the locking collar may be done with suitable torque-applying means such as the impact wrench 70 (FIG. 7) equipped with a square bit 72 for engaging the drive hole 26 in the tool 10. The impact wrench must also, of course, drive in the normal direction of rotation of the shaft. In typical operations and assemblies, three to five seconds of impact wrench application is sufficient but typical bearing designs are such that there is little risk of damage from overtightening.

The tool 10 is disengaged from the locking collar 62 by retracting it axially so that the tongue 40 is once more axially extended. Then, clearance between the sleeve bore 20 and the surface 74 of the shaft 54 permits the drive pin 44 to be lifted from the locking collar drive hole 60 for complete removal of the tool 10. As is conventional, the locking collar 62 is finally secured by tightening the set screw 76.

The compactness and adaptability of the tool are evident from the drawings. The sleeve 12 of the tool may be made as long as desired to accommodate lengthly extensions or overhangs of shafts, such as that of shaft 54' indicated in phantom outline in FIG. 2 and this, together with the relatively small diameter of the collar holder portion 28, allows the tool to reach deep into confined spaces to install and tighten a locking collar. Assembly time is often less than required for the conventional hammer and drift method and when a preset and adjustable torque-applying tool, such as an impact wrench, is used, required locking torques are easily and consistently obtained.

We claim:

1. A locking collar tool for assembling and tightening an eccentrically cammed locking collar onto a mating eccentrically cammed extended inner race of a bearing, the bearing being mounted on a shaft and accessible from an end of the shaft, rotation of the collar relative to the inner race generating a locking force between the inner race and the shaft and the collar having a generally cylindrical outer surface including a drive hole, comprising:

a sleeve having a holder end and a drive end and a longitudinal axis and including:

a generally cylindrical socket included in the holder end for receiving and holding the collar generally coaxial with the longitudinal axis of the sleeve; and a tongue carried by the holder end, having a radially inwardly extending drive pin and being axially shiftable so that the drive pin may move from a receiving position spaced axially outside the collar holding socket and a retaining position axially within the socket, so that the locking collar drive hole may be engaged by the drive pin and collar and tongue may be moved axially so that the collar is supported in the socket with the tongue drive pin drivably engaging the drive hole of the collar.

2. The locking collar tool of claim 1 wherein the sleeve drive end includes an axially extending drive socket for receiving, non-rotatably, drive means for rotating the sleeve about its longitudinal axis.

3. The locking collar tool of claim 1 and further including friction means effective between the tongue and holder end of the sleeve for maintaining the tongue in a selected axial disposition to assist in retaining the collar in the collar holding socket.

4. The locking collar tool of claim 3 wherein the friction means includes a friction element carried by the tongue and biased to extend from the tongue and engage the holder end.

5. The locking collar tool of claim 1 wherein the collar holder socket has an internal shoulder for abutting the collar and positioning it axially with respect to the socket and holding it square with the axis of the sleeve.

6. A tool for installing the locking collar of a bearing in an arrangement in which the bearing is mounted on a shaft and accessible from an end of the shaft, the bearing including an inner race concentrically supporting the shaft, the inner race including an axial extension extending towards the shaft end for receiving an annular locking collar, the collar having a generally cylindrical external surface including a drive hole and the extension and the collar having, respectively, substantially matching eccentric external and internal annular cam surfaces, sized so that in assembly relative rotation mutually engages the surfaces and induces a locking action between the shaft and the inner race so as to hold the inner race against movement on the shaft, comprising:

a sleeve having a longitudinal bore large enough to pass over the shaft, a drive end, a holder end and a longitudinal axis;

an annular locking collar holder carried in fixed relationship by the holder end, sized for receiving and supporting the circumferential surface of the locking collar and holding the locking collar generally concentrically with the sleeve axis; and an axially extending and axially slidable tongue contained by the holder end of the sleeve and extending into the holder and having a radially inwardly extending drive pin for drivably engaging the locking collar drive hole, the tongue being movable between a collar-receiving position in which the drive pin is axially outside the locking collar holder and a collar holding position in which the drive pin is axially within the locking collar holder, for non-rotatably retaining the locking collar in the holder.

7. The tool of claim 6 and further including means effective between the tongue and the holder end for holding the tongue in a selected axial disposition relative to the holder end.

8. The tool of claim 6 wherein the drive end includes a means for drivably receiving a second tool for driving the locking collar tool rotatably about the longitudinal axis of the sleeve for rotating the locking collar relative to the bearing inner race.

9. The tool of claim 8 wherein the second tool is a powered impact wrench.

10. The tool of claim 6 wherein the locking collar holder includes a shoulder for abutting the locking collar for positioning it perpendicular to the sleeve axis.

11. The tool of claim 6, and further including stop means engageable between the tongue and the holder end for establishing an outer limit of axial sliding of the tongue.

* * * * *